US012772218B2

(12) United States Patent
Gou et al.

(10) Patent No.: US 12,772,218 B2
(45) Date of Patent: Oct. 20, 2026

(54) CONFIGURATION METHOD AND DEVICE FOR SEMI-STATIC TRANSMISSION

(71) Applicant: ZTE Corporation, Shenzhen (CN)

(72) Inventors: Wei Gou, Shenzhen (CN); Peng Hao, Shenzhen (CN); Junfeng Zhang, Shenzhen (CN); Shuaihua Kou, Shenzhen (CN); Jing Shi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 171 days.

(21) Appl. No.: 18/522,136

(22) Filed: Nov. 28, 2023

(65) Prior Publication Data

US 2024/0260011 A1 Aug. 1, 2024

Related U.S. Application Data

(63) Continuation of application No. PCT/CN2021/141094, filed on Dec. 24, 2021.

(51) Int. Cl.
*H04W 72/0446* (2023.01)
*H04L 1/1812* (2023.01)
(Continued)

(52) U.S. Cl.
CPC ....... *H04W 72/0446* (2013.01); *H04L 1/1812* (2013.01); *H04W 72/0453* (2013.01); *H04W 76/20* (2018.02)

(58) Field of Classification Search
CPC ............. H04W 72/0446; H04W 76/20; H04W 72/0453; H04L 1/1812
See application file for complete search history.

(56) References Cited

U.S. PATENT DOCUMENTS

2018/0368114 A1 12/2018 Chen et al.
2020/0396024 A1* 12/2020 Ganesan ............... H04L 1/1864
(Continued)

FOREIGN PATENT DOCUMENTS

CN 101932031 A * 12/2010
CN 110278610 A 9/2019
(Continued)

OTHER PUBLICATIONS

JPO, Office Action for Japanese Application No. 2024-535801, mailed on Jul. 7, 2025, 6 pages with unofficial English translation.
(Continued)

*Primary Examiner* — Samina F Choudhry
(74) *Attorney, Agent, or Firm* — Ashurst Perkins Coie US LLP

(57) ABSTRACT

A wireless communication method includes configuring a first wireless device for a communication between the first wireless device and a second wireless device according to a semi-static configuration that specifies a time slot pattern for the communication. M carriers are configured for the communication, where M is an integer greater than 1. The time slot pattern is configured across the M carriers based on the units of time slots of a reference carrier of the M carriers. For each time slot in the time slot pattern, a corresponding carrier from the M carriers and/or a slot in the corresponding carrier on which the communication occurs is specified by a rule.

28 Claims, 10 Drawing Sheets

(51) Int. Cl.
*H04W 72/0453* (2023.01)
*H04W 76/20* (2018.01)

(56) References Cited

U.S. PATENT DOCUMENTS

| | | | | |
|---|---|---|---|---|
| 2021/0360616 | A1* | 11/2021 | Yi | H04L 5/0053 |
| 2022/0086816 | A1 | 3/2022 | Zhang et al. | |
| 2022/0094465 | A1 | 3/2022 | Shen | |
| 2022/0116172 | A1 | 4/2022 | Tang et al. | |

FOREIGN PATENT DOCUMENTS

| | | | | |
|---|---|---|---|---|
| CN | 111837443 | A | 10/2020 | |
| CN | 113747586 | A | 12/2021 | |
| EP | 3 713 331 | A1 | 9/2020 | |
| JP | 2021-510019 | A | 4/2021 | |
| WO | WO-2019095273 | A1 * | 5/2019 | H04W 72/20 |
| WO | WO-2020239042 | A1 * | 12/2020 | H04W 72/23 |
| WO | 2023/050256 | A1 | 4/2023 | |

OTHER PUBLICATIONS

JPO, Notice of Allowance for Application No. 2024-535801, mailed on Oct. 21, 2025, 4 pages with unofficial English translation.
Qualcomm Incorporated, "HARQ-ACK enhancement for IOT and URLLC," 3GPP TSG RAN WG1 #105-e, e-Meeting, R1-2104663, May 10-27, 2021, 21 pages.
International Search Report and Written Opinion for International Application No. PCT/CN2021/141094, mailed on Jul. 29, 2022 (6 pages).
Qualcomm Incorporated, "NR-LTE Co-channel Coexistence Considerations," 3GPP TSG RAN WG1 #89, Hangzhou, China, R1-1708655, May 15-19, 2017, 6 pages.
EPO, Extended European Search Report for European Application No. 21 968 650.8, mailed on Oct. 28, 2024, 12 pages.
Moderator (Nokia), "Moderator summary #1 on HARQ-ACK feedback enhancements for NR Rel-17 URLLC/IIoT," 3GPP TSG-RAN WG1 Meeting #106-e. e-Meeting, R1-2106639, Aug. 16-27, 2021, 67 pages.
INPI, First Examination Report for Indian Application No. 202417037538, mailed on Jul. 29, 2026, 7 pages.

* cited by examiner

CONFIGURATION METHOD AND DEVICE FOR SEMI-STATIC TRANSMISSION

CROSS-REFERENCE TO RELATED APPLICATION

This application is a continuation and claims priority to International Application No. PCT/CN2021/141094, filed on Dec. 24, 2021, the disclosure of which is hereby incorporated by reference herein in its entirety.

TECHNICAL FIELD

The present document is directed generally to wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

The disclosed techniques may be used by various embodiments to implement semi-static configurations for transmission in wireless communication networks.

In one example aspect, a method of wireless communication is disclosed. The method includes configuring a first wireless device for a communication between the first wireless device and a second wireless device according to a semi-static configuration that specifies a time slot pattern for the communication. M carriers are configured for the communication, where M is an integer greater than 1. The time slot pattern is configured across the M carriers based on the units of time slots of a reference carrier of the M carriers. For each time slot in the time slot pattern, a corresponding carrier from the M carriers and/or a slot in the corresponding carrier on which the communication occurs is specified by a rule.

In another example aspect, a wireless communication apparatus is disclosed. The wireless communication apparatus comprises a processor configured to implement a method described in the present document.

In another example aspect, a computer-readable medium is disclosed. The computer-readable medium stores code that, upon execution by a processor, causes the processor to implement a method described in the present document.

These, and other, aspects are described throughout the document.

DETAILED DESCRIPTION

Headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only and may be used in wireless systems that implemented other protocols.

Techniques are disclosed at least for a configuration method and device for semi-static transmission.

I. Introduction

In a wireless communication network, wireless bandwidth is precious. Therefore, reducing amount of overhead used by transmission of control messages frees up wireless bandwidth for user data transmissions. One technique for achieving reduction in the amount of control transmission bandwidth is to use a "semi-static" configuration in which a particular control setting is used over an extended period of time (e.g., several 10$s$ of milliseconds) until a subsequent control message changes the configuration. The existing semi-static transmission configuration includes downlink semi-static transmission configuration and uplink semi-static transmission configuration.

For the downlink semi-static transmission configuration in New Radio (NR), multiple downlink semi-static transmissions are allowed to be configured for delay-sensitive services (such as Ultra-reliable Low Latency Communication URLLC), where the minimum period is allowed to be configured as a slot. However, for a Time Division Duplexing TDD carrier (or cell or Bandwidth Part BWP), a configured downlink semi-static transmission period may be located in an uplink time slot, which will cause the downlink transmission to be interrupted.

Figure 1:
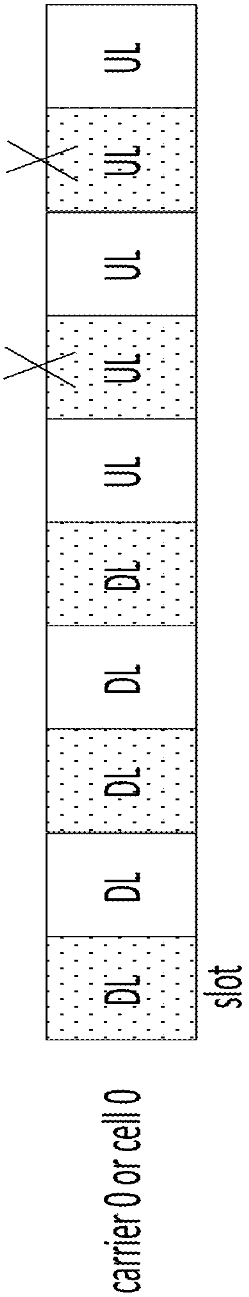
FIGS. 1-4 show examples of semi-static transmission configurations.
Figure 2:
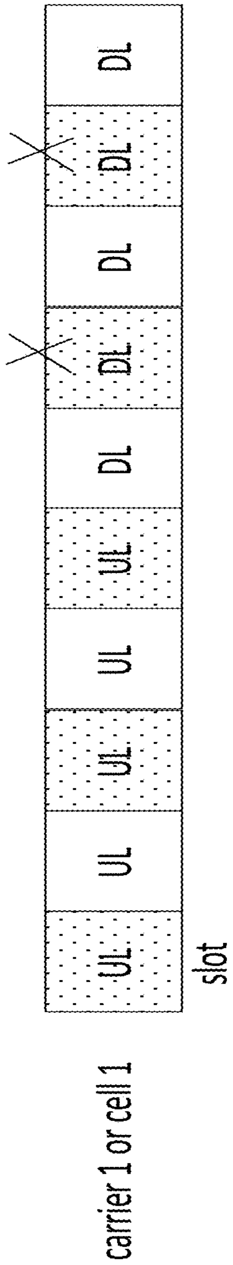

FIG. 1 shows an example of time slots in a TDD carrier (time represents horizontal axis in FIGS. 1 to 8). For example, in FIG. 1, in a TDD carrier, a downlink semi-static transmission with a period of 2 slots is configured (dot-filled blocks). However, in the 7th and 9th slots, the downlink semi-static transmission is interrupted because the 7th and 9th slots are uplink slots. This is marked as "x" in these slots. This inconsistency between the semi-static configuration and actual configuration will potentially affect the transmission of downlink data, especially for delay-sensitive data.

The same problem may also appear in the uplink semi-static transmission configuration. For example, in FIG. 2, in a TDD carrier (or cell or BWP), an uplink semi-static transmission with a period of 2 slots is configured (marked as dot-filled block). However, in the seventh and ninth slots, the uplink semi-static transmission is interrupted because the seventh and ninth slots are downlink slots. This will potentially affect the transmission of uplink data, especially for delay-sensitive data.

In order to solve the above-mentioned problem that causes the uplink or downlink semi-static transmission to be interrupted, among other issues, a new configuration method for uplink or downlink semi-static transmission is proposed below.

II. Example Embodiments

Embodiment 1

One feature of this embodiment is to configure a downlink semi-static transmission to span multiple carriers or cells or BWPs.

Figure 3:
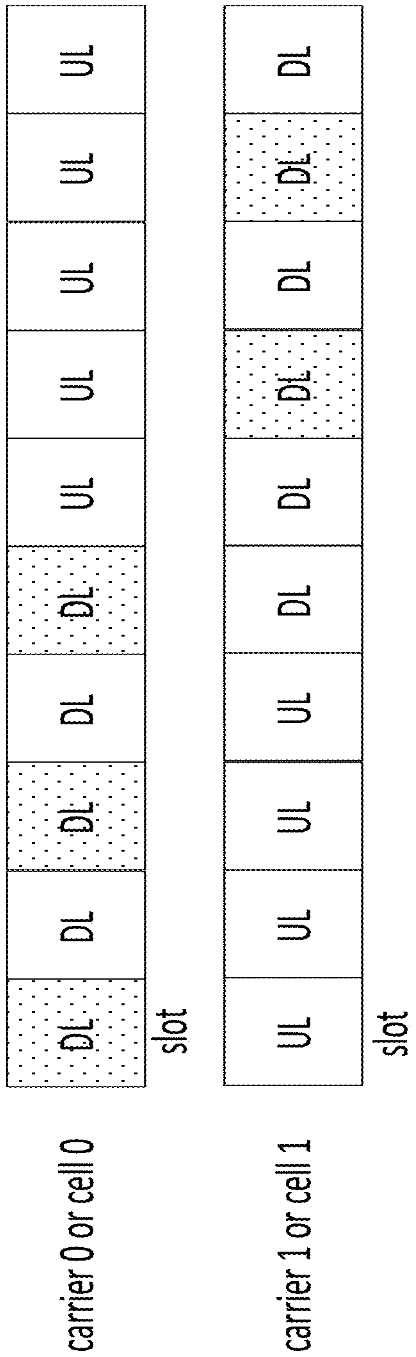

In FIG. 3, a downlink semi-static transmission is configured across carrier 0 and carrier 1. A downlink semi-static transmission with a period of 2 slots is configured for interactive transmission between carrier 0 and carrier 1 based on the configured period pattern between carrier 0 and carrier 1.

As shown in FIG. 3, according to the frame structure of carrier 0, the first 5 slots are downlink slots, so the first 3 periods are configured in carrier 0, which are located in the first, third, and fifth slots of carrier 0, respectively. The next 2 periods are configured in the 7th and 9th slots of carrier 1. In this way, a downlink semi-static transmission across carrier 0 and carrier 1 can be configured. The configuration pattern in FIG. 3 can be regarded as a configuration period between carrier 0 and carrier 1 for a semi-static transmission. The configuration period can be repeated in the time domain. For example, a simple understanding is that FIG. 3 provides a configuration pattern of downlink semi-static transmission corresponding to one configuration period.

The above method can also be adopted when a downlink semi-static transmission is configured to span more carriers or cells or BWPs. For example, the downlink semi-static transmission resources are configured from different carriers based on the period corresponding to the downlink semi-static transmission. Obviously, this method is very suitable for the case of a TDD carrier. In fact, this configuration can also be implemented between a combination of a TDD carrier and an Frequency Division Duplexing FDD carrier, or between multiple FDD carriers.

The specific configuration method can be adopted is described below:

Configure a Downlink Semi-Static Transmission to Transmit Across Multiple Carriers:

Determine a reference carrier from the carriers that are allowed to configure cross-carrier transmission. Use the slot of the reference carrier as the granularity to configure the period of the downlink semi-static transmission. For example, on the reference carrier, determine the slots corresponding to the period of the downlink semi-static transmission. For example, in FIG. 3, the reference carrier is carrier 0, and the period of the downlink semi-static transmission is determined to be 2 slots based on the reference carrier. Determine that the slots corresponding to the period of the downlink semi-static transmission are the first, third, and fifth slots of carrier 0, respectively.

Determine the carrier and the corresponding slot of each period, based on the determined downlink semi-static transmission period (a slot of a reference carrier is equivalent to the position of a downlink semi-static transmission period). For example, signaling (based on DCI or RRC or MAC CE) is used to configure the carrier and the corresponding slot where the position of each period of the downlink semi-static transmission is located. For example, in FIG. 3, the first period of the downlink semi-static transmission is configured in carrier 0 and is configured in the first slot of carrier 0. The second period of the downlink semi-static transmission is configured in carrier 0 and is configured in the third slot of carrier 0. The third period of the downlink semi-static transmission is configured in carrier 0 and is configured in the fifth slot of carrier 0. The fourth period of the downlink semi-static transmission is configured in carrier 1 and is configured in the seventh slot of carrier 1. The fifth period of the downlink semi-static transmission is configured in carrier 1 and is configured in the ninth slot of carrier 1.

One Example of a Specific Configuration Method:

Determining (or configuring) a pattern configuration period for downlink semi-static transmission. In the pattern configuration period, the carrier and the slot in the carrier where the period of each downlink semi-static transmission is located can be configured based on the period of the downlink semi-static transmission determined based on the slot of the reference carrier.

For example, a carrier index and corresponding slot are indicated for each cycle of downlink semi-static transmission. For another example, when only 2 carriers are configured to support downlink semi-static transmission, based on the determined (or configured) pattern configuration period of downlink semi-static transmission, 1 bit is set for each downlink semi-static transmission period. When the 1 bit is set to 1, it means that the downlink semi-static transmission period is located in the reference carrier, and the slot in the reference carrier for the downlink semi-static transmission is the slot where the downlink semi-static transmission period is located. When the 1 bit is set to 0, it means that the downlink semi-static transmission period is located in another carrier, and the slot in the another carrier for the downlink semi-static transmission is defaulted in the slot that overlaps with the slot where the downlink semi-static transmission period is located in the reference carrier. For the value of 1 bit, vice versa.

If a downlink (or uplink) semi-static transmission is configured to transmit across multiple carriers, but if one of the multiple carriers is deactivated, then the transmission period corresponding to the downlink (or uplink) semi-static transmission in the deactivated carrier is cancelled. And the transmission period is switched to the corresponding Pcell or reference carrier by default.

The pattern configuration period of the downlink semi-static transmission here may be the frame period of the reference carrier, a common frame period between the reference carrier and other carriers, or a period configured by RRC signaling.

Here, the aforementioned reference carrier can be determined as a primary cell PCell, or a carrier with a minimum/maximum index, or a carrier with a minimum or maximum Subcarrier Spacing SCS, or a reference carrier can be configured.

The above-mentioned semi-static transmission period can be determined based on the slot of the reference carrier, and can also be determined based on the slot length configured by the signaling.

The base station can configure some carriers for a user device, or a user equipment, UE, and configure a semi-static transmission to transmit across these carriers.

Further, considering the difference in UE capabilities, it is necessary to further introduce UE capability signaling to distinguish whether the UE has the ability to support one downlink semi-static transmission across multiple carriers. For example, an RRC signaling is introduced for the UE to report whether the UE has this capability. For example, an RRC signaling is used for the UE to report that it has (or does not have) the capability. If the UE has this capability, the base station can configure the UE to transmit a downlink semi-static transmission across multiple carriers. Otherwise, if the UE does not have the reporting capability, the base station cannot configure the UE to transmit a downlink semi-static transmission across multiple carriers.

This configuration may help to reduce delays. Based on the above configuration method, the base station can transmit a downlink semi-static transmission between carrier 0 and carrier 1 through interactive transmission, thereby avoiding the problem of frame structure conflicts caused by configuring downlink semi-static transmission based on one carrier.

Furthermore, in this configuration, two possible methods are given about how to determine a PDSCH resource for downlink semi-static transmission in the slots used for downlink semi-static transmission in carrier 0 and carrier 1.

Method 1: for a downlink semi-static transmission of cross-carrier (for example, carrier 0 and carrier 1) transmission, the PDSCH resource is configured for the transmission period in carrier 0 based on parameter 1, and the PDSCH resource is also configured for the transmission period in carrier 1 based on parameter 1. In this way, the PDSCH candidate resource sets are configured in carrier 0 and carrier 1, and then the same index value (parameter 1) is used to determine the corresponding PDSCH resource from the PDSCH candidate resource sets of carrier 0 and carrier 1 respectively. This method can save signaling, but requires the base station to reasonably configure the PDSCH candidate resource set on carrier 0 and carrier 1, so that the available PDSCH resources from carrier 0 and carrier 1 can be obtained using the same index value.

Method 2: For a downlink semi-static transmission of cross-carrier transmission, in different carriers, use independent parameters to configure the corresponding PDSCH resources in different carriers. For example, for a semi-static transmission of cross-carrier transmission, the PDSCH resource is configured based on parameter 1 for the transmission period in carrier 0, and the PDSCH resource is configured based on parameter 2 for the transmission period in carrier 1. Compared with method 1, this method is flexible. Parameter 1 and parameter 2 are both included in the activated DCI or included in the RRC signaling.

Embodiment 2

The similar method as described in Embodiment 1 can be used for uplink semi-static transmission. An uplink semi-static transmission can be configured to span multiple carriers, cells, or BWPs as described in the following examples.

Figure 4:
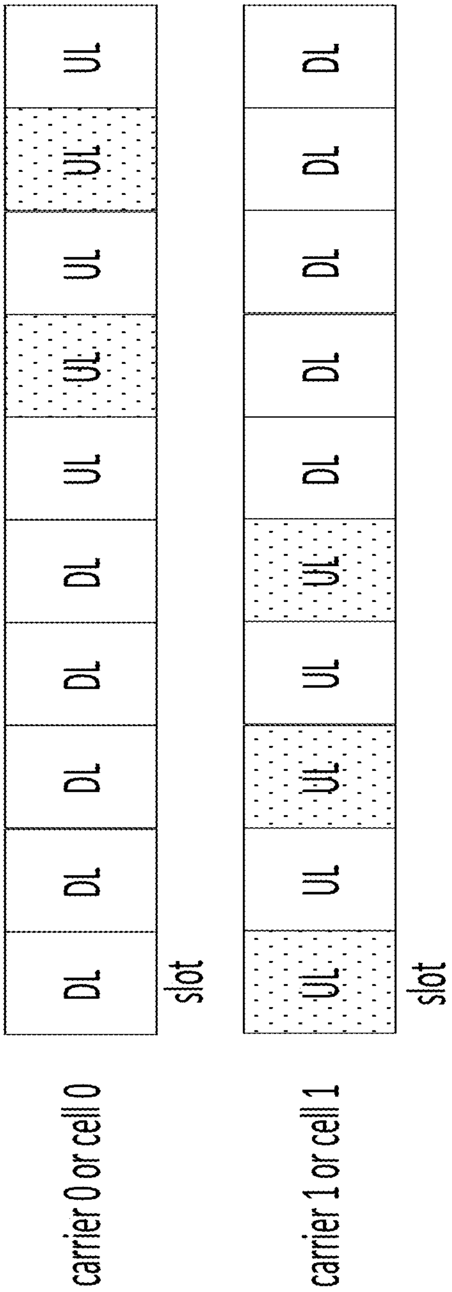

In FIG. 4, an uplink semi-static transmission is configured across carrier 0 and carrier 1. An uplink semi-static transmission with a period of 2 slots is configured for interactive transmission between carrier 0 and carrier 1 based on the configured period pattern between carrier 0 and carrier 1.

According to FIG. 4, according to the frame structure of carrier 1, the first 5 slots are uplink slots, so the first 3 periods are configured in carrier 1, which are located in the first, third, and fifth slots of carrier 1, respectively. The next 2 periods are configured in the 7th and 9th slots of carrier 0. In this way, a uplink semi-static transmission across carrier 0 and carrier 1 can be configured. The configuration pattern in FIG. 4 can be regarded as a configuration period between carrier 0 and carrier 1 for a semi-static transmission. The configuration period can be repeated in the time domain. For example, a simple understanding is that FIG. 4 only provides a configuration pattern of uplink semi-static transmission corresponding to one configuration period.

The above method can also be adopted when an uplink semi-static transmission is configured to span more carriers or cells or BWPs. For example, the uplink semi-static transmission resources are configured from different carriers based on the period corresponding to the uplink semi-static transmission. Obviously, this method is very suitable for the case of a TDD carrier. In fact, this configuration can also be implemented between a combination of a TDD carrier and an FDD carrier, or between multiple FDD carriers.

One possible specific configuration method is described below:

Configure an Uplink Semi-Static Transmission to Transmit Across Multiple Carriers:

Determine a reference carrier from the carriers that are allowed to configure cross-carrier transmission. Use the slot of the reference carrier as the granularity to configure the period of the uplink semi-static transmission. For example, on the reference carrier, determine the slots corresponding to the period of the uplink semi-static transmission. For example, in FIG. 4, the reference carrier is carrier 0, and the period of the uplink semi-static transmission is determined to be 2 slots based on the reference carrier. Determine that the slots corresponding to the period of the uplink semi-static transmission are the first, third, and fifth slots of carrier 0, respectively.

Determine the carrier and the corresponding slot of each period, based on the determined uplink semi-static transmission period (a slot of a reference carrier is equivalent to the position of an uplink semi-static transmission period). For example, signaling (based on downlink control information DCI or radio resource control RRC or medium access control control element MAC CE) is used to configure the carrier and the corresponding slot where the position of each period of the uplink semi-static transmission is located. For example, in FIG. 4, the first period of the uplink semi-static transmission is configured in carrier 1 and is configured in the first slot of carrier 1. The second period of the uplink semi-static transmission is configured in carrier 1 and is configured in the third slot of carrier 1. The third period of the uplink semi-static transmission is configured in carrier 1 and is configured in the fifth slot of carrier 1. The fourth period of the uplink semi-static transmission is configured in carrier 0 and is configured in the seventh slot of carrier 0. The fifth period of the uplink semi-static transmission is configured in carrier 0 and is configured in the ninth slot of carrier 0.

Specific Configuration Method Example:

Determining (or configuring) a pattern configuration period for uplink semi-static transmission. In the pattern configuration period, the carrier and the slot in the carrier where the period of each uplink semi-static transmission is located can be configured based on the period of the uplink semi-static transmission determined based on the slot of the reference carrier.

For example, a carrier index and corresponding slot are indicated for each cycle of uplink semi-static transmission.

For another example, when only 2 carriers are configured to support uplink semi-static transmission, based on the determined (or configured) pattern configuration period of uplink semi-static transmission, 1 bit is set for each uplink semi-static transmission period. When the 1 bit is set to 1, it means that the uplink semi-static transmission period is located in the reference carrier, and the slot in the reference carrier for the uplink semi-static transmission is the slot where the uplink semi-static transmission period is located. When the 1 bit is set to 0, it means that the uplink semi-static transmission period is located in another carrier, and the slot in another carrier for the uplink semi-static transmission is the slot that overlaps with the slot where the uplink semi-static transmission period is located in the reference carrier. For the value of 1 bit, vice versa.

If an uplink semi-static transmission is configured to transmit across multiple carriers, but if one of the multiple carriers is deactivated, then the transmission period corresponding to the uplink semi-static transmission in the deactivated carrier is cancelled. And the transmission period is switched to the corresponding Pcell or reference carrier by default.

The pattern configuration period of the uplink semi-static transmission here may be the frame period of the reference carrier, a common frame period between the reference carrier and other carriers, or a period configured by RRC signaling.

Here, the aforementioned reference carrier can be determined as a PCell, or a carrier with a minimum/maximum index, or a carrier with a minimum or maximum SCS, or a reference carrier can be configured.

The above-mentioned semi-static transmission period can be determined based on the slot of the reference carrier, and can also be determined based on the slot length configured by the signaling.

The base station can configure some carriers for the UE, and configure a semi-static transmission to transmit across these carriers.

Further, considering the difference in UE capabilities, it is necessary to further introduce UE capability signaling to distinguish whether the UE has the ability to support one uplink semi-static transmission across multiple carriers. For example, an RRC signaling is introduced for the UE to report whether the UE has this capability. For example, an RRC signaling is used for the UE to report that it has (or does not have) the capability. If the UE has this capability, the base station can configure the UE to transmit a uplink semi-static transmission across multiple carriers. Otherwise, if the UE does not have the reporting capability, the base station cannot configure the UE to transmit a uplink semi-static transmission across multiple carriers.

This configuration helps to reduce delays (as mentioned in the background art). Based on the above configuration method, the base station can transmit an uplink semi-static transmission between carrier 0 and carrier 1 through interactive transmission, thereby avoiding the problem of frame structure conflicts caused by configuring uplink semi-static transmission based on one carrier.

Furthermore, in this configuration, two methods are proposed on to determine whether a physical uplink shared channel PUSCH resource for uplink semi-static transmission in the slots used for uplink semi-static transmission in on carrier 0 or carrier 1.

Method 1: for an uplink semi-static transmission of cross-carrier (for example, carrier 0 and carrier 1) transmission, the PUSCH resource is configured for the transmission period in carrier 0 based on parameter 1, and the PUSCH resource is also configured for the transmission period in carrier 1 based on parameter 1. In this way, the PUSCH candidate resource sets are configured in carrier 0 and carrier 1, and then the same index value (parameter 1) is used to determine the corresponding PUSCH resource from the PUSCH candidate resource sets of carrier 0 and carrier 1 respectively. This method can save signaling but requires the base station to reasonably configure the PUSCH candidate resource set on carrier 0 and carrier 1, so that the available PUSCH resources from carrier 0 and carrier 1 can be obtained using the same index value.

Method 2: For an uplink semi-static transmission of cross-carrier transmission, in different carriers, use independent parameters to configure the corresponding PUSCH resources in different carriers. For example, for a semi-static transmission of cross-carrier transmission, the PUSCH resource is configured based on parameter 1 for the transmission period in carrier 0, and the PUSCH resource is configured based on parameter 2 for the transmission period in carrier 1. Compared with method 1, this method is flexible. Parameter 1 and parameter 2 are both included in the activated DCI or included in the RRC signaling.

Embodiment 3

When a semi-static transmission, either an uplink semi-static transmission or a downlink semi-static transmission, needs to be configured to span multiple carriers, the slot lengths corresponding to different carriers are different because different SCS or subslots are configured. Two examples are given below to show how should a semi-static transmission be configured in this circumstance.

Figure 5:
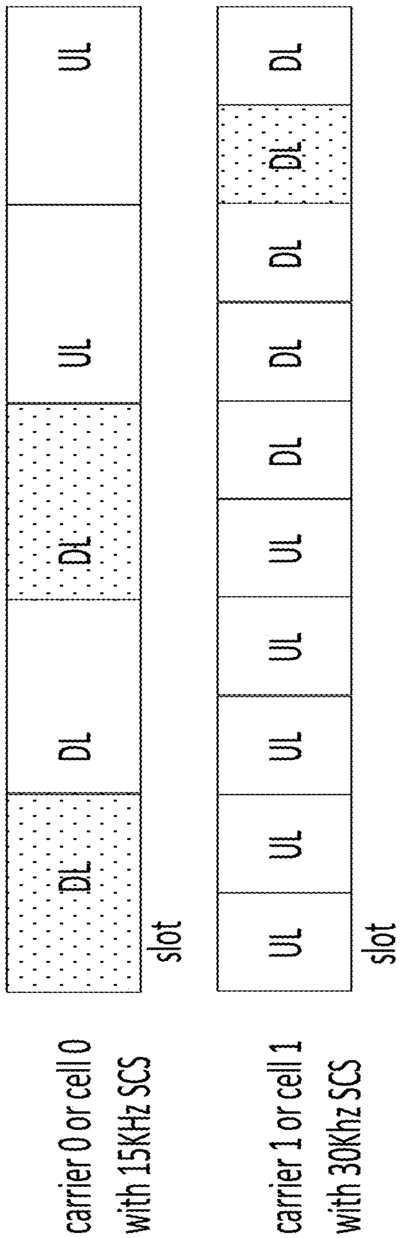
FIG. 5 shows an example of downlink semi-static transmission across multiple carriers.
Figure 6:
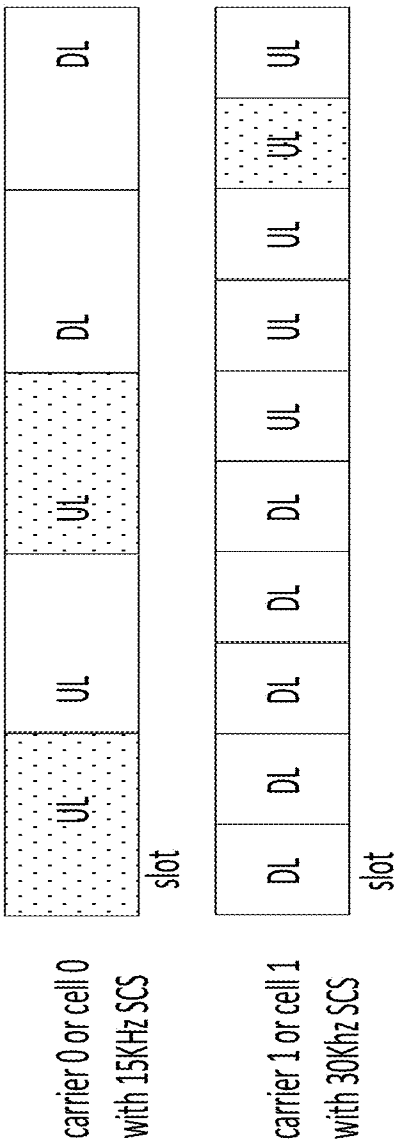
FIG. 6 shows an example of uplink semi-static transmission across multiple carriers.

In FIG. 5 or FIG. 6, the slot length of carrier 0 is twice the slot length of carrier 1, e.g., the SCS of carrier 0 is 15 KHz, and the SCS of carrier 1 is 30 KHz, or if carrier 0 is not configured with subslot and carrier 1 is configured with 2 subslots (each subslot contains 7 symbols).

Specific Configuration Method:

The configuration method described for this Embodiment is different from Embodiment 1 in determining the carrier and the corresponding slot for a semi-static transmission.

Configure a Downlink (or Uplink) Semi-Static Transmission to Transmit Across Multiple Carriers:

Determine a reference carrier from the carriers that are allowed to configure cross-carrier transmission. Use the slot of the reference carrier as the granularity to configure the period of the downlink (or uplink) semi-static transmission. For example, on the reference carrier, determine the slots corresponding to the period of the downlink (or uplink) semi-static transmission. For example, in FIG. 5 or FIG. 6, the reference carrier is carrier 0. The period of downlink (or uplink) semi-static transmission is determined as 2 slots based on the slot length of the reference carrier. Determine that the slots corresponding to the period of the downlink (or uplink) semi-static transmission are the first, third, and fifth slots of carrier 0, respectively.

Determine the carrier and the corresponding slot of each period, based on the determined downlink semi-static transmission period (a slot of a reference carrier is equivalent to the position of a downlink (or uplink) semi-static transmission period). For example, signaling (based on DCI or RRC or MAC CE) is used to configure the carrier and the corresponding slot where the position of each period of the downlink (or uplink) semi-static transmission is located. For example, in FIG. 5 or FIG. 6, configure the first cycle of downlink (or uplink) semi-static transmission in carrier 0 and correspond to the first slot of carrier 0. Configure the second cycle of downlink (or uplink) semi-static transmission in carrier 0 and correspond to the third slot of carrier 0. Configure the third cycle of downlink (or uplink) semi-static transmission in carrier 1 and correspond to the ninth slot of carrier 1 (It can also be described as: Since the third cycle corresponds to the fifth slot of carrier 0 (reference carrier), a slot from the multiple slots in carrier 1 that overlap with the fifth slot in carrier 0 is configured or defaulted for the third cycle of downlink (or uplink) semi-static transmission. It can be configured through DCI, RRC, or MAC CE signaling, or the first slot from multiple slots is defaulted to be the third cycle).

Specific Configuration Method:

For example, determine (or configure) a pattern configuration period for downlink (or uplink) semi-static transmission. In the configuration period, the carrier and the slot in the carrier where the period of each downlink (or uplink) semi-static transmission is located can be configured based on the period of downlink (or uplink) semi-static transmission determined based on the slot of the reference carrier. For example, in the pattern configuration period of downlink (or uplink) semi-static transmission, a carrier index and corresponding slot are indicated based on each period of downlink (or uplink) semi-static transmission. If a slot corresponding to a period in the reference carrier overlaps with multiple slots of another carrier (for example, carrier 1), and further configure or default one slot from the multiple slots for the period.

For example, FIG. 5 or FIG. 6 illustrate the configuration of the third cycle of semi-static transmission: since the third period of the downlink (or uplink) semi-static transmission corresponds to an uplink (or downlink) slot of the reference carrier, the third period is configured for transmission in carrier 1. However, the uplink (or downlink) slot in the reference carrier overlaps with the 2 slots in carrier 1, then further signaling configuration or default one slot can be used for downlink (or uplink) semi-static transmission from the 2 slots. For example, the first slot is selected from the 2 slots by default. For another example, in the case that only 2 carriers are configured to support downlink (or uplink) semi-static transmission, based on the determined (or configured) pattern configuration period of downlink semi-static transmission, 1 bit is set for each downlink (or uplink) semi-static transmission period. When the 1 bit is set to 1, it means that the downlink (or uplink) semi-static transmission period is located in the reference carrier, and the slot in the reference carrier for the downlink (or uplink) semi-static transmission is the slot where the downlink (or uplink) semi-static transmission period is located. When the 1 bit is set to 0, it means that the downlink (or uplink) semi-static transmission period is located on another carrier, and the slot in another carrier for the downlink (or uplink) semi-static transmission is defaulted in the first slot of multiple slots that overlap with the slot where the downlink (or uplink) semi-static transmission period is located in the reference carrier. For the value of 1 bit, vice versa may be used.

If a downlink (or uplink) semi-static transmission is configured to transmit across multiple carriers, but if one of the multiple carriers is deactivated, then the transmission period corresponding to the downlink (or uplink) semi-static transmission in the deactivated carrier is cancelled. And the transmission period is switched to the corresponding Pcell or reference carrier by default.

The pattern configuration period of the downlink (or uplink) semi-static transmission here may be the frame period of the reference carrier, a common frame period between the reference carrier and other carriers, or a period configured by RRC signaling.

Here, the aforementioned reference carrier can be determined as a PCell, or a carrier with a minimum/maximum index, or a carrier with a minimum or maximum SCS, or a reference carrier can be configured.

The above-mentioned semi-static transmission period can be determined based on the slot of the reference carrier, and can also be determined based on the slot length configured by the signaling.

The base station can configure some carriers for the UE, and configure a semi-static transmission to transmit across these carriers.

Further, considering the difference in UE capabilities, it is necessary to further introduce UE capability signaling to distinguish whether the UE has the ability to support one uplink semi-static transmission across multiple carriers. For example, an RRC signaling is introduced for the UE to report whether the UE has this capability. For example, an RRC signaling is used for the UE to report that it has (or does not have) the capability. If the UE has this capability, the base station can configure the UE to transmit a uplink semi-static transmission across multiple carriers. Otherwise, if the UE does not have the reporting capability, the base station cannot configure the UE to transmit an uplink semi-static transmission across multiple carriers.

Furthermore, in this configuration, the methods disclosed in Embodiment 1 and 2 can be adopted to determine whether a PDSCH (or PUSCH) resource for uplink semi-static transmission in the slots used for uplink semi-static transmission is in carrier 0 and carrier 1.

In some implementations, two parameters may be used in order to determine the carrier and slot corresponding to a period of transmission. The period is determined based on the slot of the reference carrier. Parameter 1 indicates a carrier on which the transmission corresponding to a period is located. Parameter 2 further indicates the slot from the carrier where the transmission corresponding to the period is located. Alternatively, or in addition, the slot from the carrier can also default to a specific slot, e.g., the first slot (or the last slot) from the carrier.

Specifically, if the slot corresponding to a period in the reference carrier and multiple slots in the carrier where the transmission corresponding to the period is overlapped in the time domain, the slot where the transmission corresponding to the period is located is instructed from the multiple slots, or the slot where the transmission corresponding to the period is located is the first valid slot from the multiple slots by default.

For example, in FIG. 5, the period is determined based on the slot of the reference carrier (carrier 0), and the slot corresponding to the period is marked as the slot of the dot-filled block in the reference carrier. For each period, configure the carrier used for transmission. For example, in FIG. 5, for the first period and the second period, the carrier configured for transmission is carrier 0, and further, the slot configured for transmission is the first slot and the third slot in carrier 0. For the third period, the carrier configured for transmission is carrier 1, and further the slot configured for transmission is one of the slots in carrier 1 overlapping with the slot in carrier 0 of the third period in the time domain. For example, the slot corresponding to the third period in carrier 0 is the fifth slot, and the fifth slot of carrier 0 and two slots of carrier 1 overlap in the time domain. Therefore, one slot from the two slots in carrier 1 is configured to transmit the third period.

Embodiment 4

This Embodiment describes how to determine the HARQ process ID of a semi-static transmission of cross-carrier transmission based on the methods in Embodiment 1 to 3.

In some embodiments, a semi-static transmission is configured to be transmitted in only one carrier, and the Hybrid Automatic Repeat reQuest HARQ process corresponding to each transmission period is determined based on the period corresponding to the semi-static transmission. See section 5.3 and 5.4 of TS38.321 for the specific calculation formula.

Section 5.3 of TS38.321 is as follows:

"For configured downlink assignments without harq-ProcID-Offset, the HARQ Process ID associated with the slot where the DL transmission starts is derived from the following equation:

$$\textit{HARQ}\text{ Process ID} = [\text{floor}(\text{CURRENT\_slot} \times 10/(\textit{numberOfSlotsPerFrame} \times \text{periodicity}))] \text{ modulo } \textit{nrofHARQ}\text{-Processes},$$

where CURRENT_slot=[(SFN×memberOfSlotsPerFrame)+slot number in the frame] and numberOfSlotsPerFrame refers to the number of consecutive slots per frame as specified in TS 38.211.

For configured downlink assignments with harq-ProcID-Offset, the HARQ Process ID associated with the slot where the DL transmission starts is derived from the following equation:

$$\textit{HARQ}\text{ Process ID} = [\text{floor}(\text{CURRENT\_slot} \times 10/(\textit{numberOfSlotsPerFrame} \times \text{periodicity}))] \text{ modulo } \textit{nrofHARQ}\text{-Processes} + \textit{harq-ProcID-Offset},$$

where CURRENT_slot=[(SFN×numberOfSlotsPerFrame)+slot number in the frame] and memberOfSlotsPerFrame refers to the number of consecutive slots per frame as specified in TS 38.211 [8]".

Section 5.4 of TS38.321 is as follows:

"For configured uplink grants neither configured with harq-ProcID-Offset2 nor with cg-Retransmission Timer, the HARQ Process ID associated with the first symbol of a UL transmission is derived from the following equation:

$$\textit{HARQ}\text{ Process ID} = [\text{floor}(\text{CURRENT\_symbol}/\text{periodicity})] \text{modulo } \textit{nrofHARQ}\text{-Processes}$$

For configured uplink grants with harq-ProcID-Offset2, the HARQ Process ID associated with the first symbol of a UL transmission is derived from the following equation:

$$\textit{HARQ}\text{ Process ID} = [\text{floor}(\text{CURRENT\_symbol}/\text{periodicity})] \text{modulo } \textit{nrofHARQ}\text{-Processes} + \textit{harq-ProcID-Offset2},$$

where CURRENT_symbol=(SFN×mimberOfSlotsPerFrame×numberOfSymbolsPerSlot+slot number in the frame×mimberOfSymbolsPerSlot+symbol number in the slot), and memberOfSlotsPerFrame and memberOfSymbolsPerSlot refer to the number of consecutive slots per frame and the number of consecutive symbols per slot, respectively as specified in TS 38.211."

Figure 7:
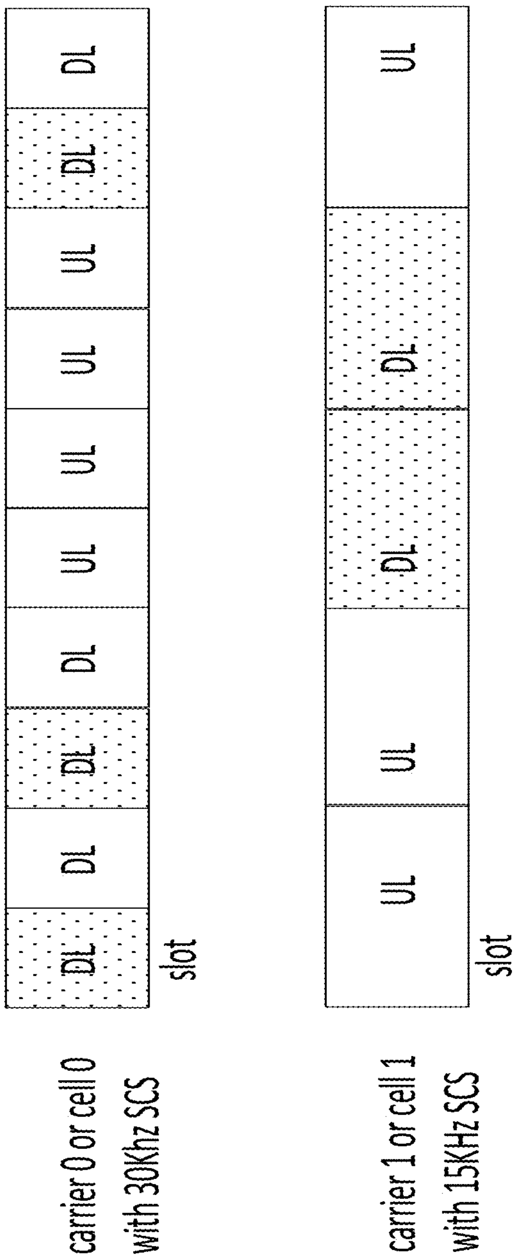
FIG. 7 shows an example of calculating the Hybrid Automatic Repeat Request HARQ process IDs.

In the above example, if part of the transmission period of a semi-static transmission is on carrier 0, the other transmission period is on carrier 1. For example, in FIG. 7, a semi-static transmission is configured for transmission on carrier 0 and carrier 1. Carrier 0 is the reference carrier, and it is determined that the period of the semi-static transmission is 2 slots based on the slot of the reference carrier. The specific transmission cycle configuration patterns are shown in FIG. 7. Then, to determine the HARQ process ID for each transmission cycle, the following rules should be followed:

For a semi-static transmission that is transmitted across multiple carriers, in order to determine the HARQ process ID corresponding to one transmission period, the period P is first determined, and then the HARQ process ID corresponding to the transmission period is calculated based on P. Here, the period P is determined from the carrier where the transmission period is located. For example, in the carrier, the period corresponding to the semi-static transmission is referred to as period P. Then use period P to replace "periodicity" in the existing calculation method (TS38.321).

In FIG. 7, when calculating the HARQ process IDs of the first, second, and fifth transmission periods, because these transmission periods are in carrier 0, and in carrier 0, the period corresponding to the semi-static transmission is 2 slots. Thus, when calculating their HARQ process ID, the period is 2 slots to calculate.

For example, in FIG. 7, when calculating the HARQ process IDs of the third and fourth transmission periods, because these transmission periods are in carrier 1, and in carrier 1, the period corresponding to the semi-static transmission is 1 slot. Therefore, when calculating their HARQ process ID, the period is 1 slot to calculate.

Therefore, for a semi-static transmission that is transmitted across multiple carriers, the HARQ process ID corresponding to a transmission period can be obtained based on the above-mentioned method.

Embodiment 5

Figure 8:
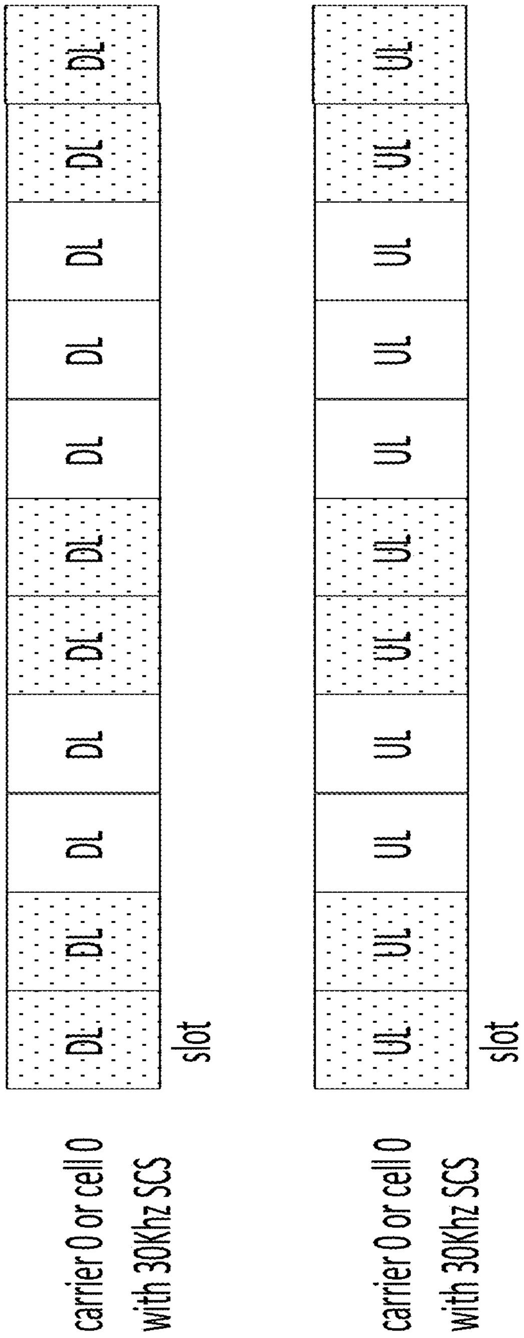
FIG. 8 shows an example of semi-static transmission configuration.

For a new type of semi-static transmission configuration, for example, multiple slots are configured for each transmission cycle, and each slot can be used for semi-static transmission. For example, the period of a semi-static transmission is 4 slots, and the transmission period of the semi-static transmission is determined based on the 4 slots. Starting from the determined period position, two continuous or discrete slots are configured to transmit the semi-static transmission. In this way, 2 slots corresponding to each transmission cycle can be used as semi-static transmission. In FIG. 8, two consecutive slots are configured for a period of uplink or downlink semi-static transmission.

For this type of semi-static transmission, the above-mentioned method can also be used. For example, this type of semi-static transmission can also be configured to transmit across multiple carriers. For example, the transmission period of semi-static transmission can be configured between carrier 0 and carrier 1. For example, the slots corresponding to a transmission period can be configured from carrier 0 and carrier 1.

In this application, the carrier mentioned can be replaced by a cell or BWP. Here, a BWP is a part of the bandwidth of a carrier. For example, a semi-static transmission is allowed to be configured to transmit across multiple BWPs, which can be from one carrier or multiple carriers.

Embodiment 6

In some embodiments, a physical uplink control channel PUCCH transmission can be switched between multiple carriers based on a semi-static PUCCH slot pattern. This technique is called semi-static PUCCH carrier switching.

Currently, interactive operations are being considered between PUCCH repetition and semi-static PUCCH carrier switching. The following provides a way to support this interactive operation.

Method Example

Determine the slot and PUCCH resource corresponding to subsequent PUCCH repetitions according to the following method.

If a UE is configured with PUCCH repetition and semi-static PUCCH carrier switching, the UE executes according to the following rules:

The UE is configured with a semi-static PUCCH carrier switching between carrier A and carrier B. If a PUCCH resource is indicated to be transmitted in a slot in carrier A, and the UE determines that the PUCCH repetition factor for the PUCCH resource is greater than 1, then the UE determines the slot for the second PUCCH repetition based on the PUCCH slots pattern determined to be based on semi-static PUCCH carrier switching between carrier A and carrier B. Note that because the PUCCH slots pattern contains slots from carrier A and carrier B, the slot corresponding to the second PUCCH repetition may come from carrier B.

Here, the PUCCH slots pattern means that according to the existing semi-static PUCCH carrier switching rules, a series of slots can be obtained from the carriers configured to support semi-static PUCCH carrier switching in the time domain.

Specifically, the slot corresponding to the second PUCCH repetition is determined based on the PUCCH slot pattern after the slot where the first PUCCH repetition is located, until the slot that meets the requirements is determined. The requirement is: if a valid PUCCH resource in a subsequent slot can be provided based on PRI (PUCCH resource indication). The determined slot is used for the second PUCCH repetition, and the valid PUCCH resource is used for the second PUCCH repetition. The same principle applies to the third, fourth . . . PUCCH repetition, and the above process can be applied.

Here, the slot and PUCCH resource for the first PUCCH repetition are determined based on the existing technology, for example, according to the indication in the (activated) DCI. The valid PUCCH resource means that the PUCCH resource does not conflict with DL symbols (also including synchronization signal block SSB and downlink control channel corresponding symbols).

This PRI is the PRI in the (activated) DCI corresponding to the first PUCCH repetition. In other words, if the PUCCH resource of the first PUCCH repetition is determined to be a PUCCH resource in carrier A based on the PRI in the (activated) DCI corresponding to the first PUCCH repetition, the UE can also determine a PUCCH resource for the second PUCCH in carrier B based on the PRI.

A new RRC signaling is introduced here for the UE to report that it supports (or does not support) interaction between PUCCH repetition and semi-static PUCCH carrier switching. If the UE reports that it supports interactive operations, the base station can configure PUCCH repetition and semi-static PUCCH carrier switching to the UE at the same time.

Based on the above method, it is possible to realize transmission for PUCCH repetition based on the PUCCH slot pattern to be determined based on semi-static PUCCH carrier switching.

Embodiment 7

In some embodiments, it is being formulated that a HARQ-ACK PUCCH can be switched for transmission between multiple carriers (such as Pcell and Scell) based on a dynamic indicator (such as a DCI indicator). This technique is called dynamic PUCCH carrier switching. At the same time, the specification of SPS HARQ-ACK delay feedback is being formulated. Its main function is to allow SPS HARQ-ACK to be delayed in subsequent slots for transmission only in Pcell.

Currently, interactive operations are being considered between SPS HARQ-ACK delay and dynamic PUCCH carrier switching. The following provides a way to support this interactive operation.

The UE is configured with SPS HARQ-ACK delay and dynamic PUCCH carrier switching.

If in Pcell, UE performs UCI multiplexing in slot w (the initial slot of SPS HARQ-ACK) in order to determine whether SPS HARQ-ACK needs to be delayed, and there is a UCI PUCCH1 scheduled by a DCI in slot t of Scell, then the UE multiplexes SPS HARQ-ACK and UCI (for example, SPS HARQ-ACK is concatenated after the UCI) if slot t and slot w overlap in time domain. The UE determines the PUCCH set from the Scell based on the sum of the size of the SPS HARQ-ACK and the size of the uplink control information UCI. The UE determines the multiplexed PUCCH from the determined PUCCH set based on the PRI in the DCI. The DCI contains a PUCCH carrier indicator field which is used to indicate a carrier for PUCCH transmission.

If the multiplexed PUCCH is invalid, SPS HARQ-ACK is delayed in Pcell or SPS HARQ-ACK is delayed in Scell. The invalid PUCCH means that the PUCCH conflicts with DL symbols (also including SSB and downlink control channel corresponding symbols).

If the multiplexed PUCCH is valid, the multiplexed PUCCH is transmitted.

If the UE tries to determine the target slot for the delayed SPS HARQ-ACK (the UE is assumed to be performing SPS HARQ-ACK delay), the UE considers the following rules:

The first case: the UE starts from slot n of the Pcell to determine the target slot in the Pcell according to the SPS HARQ-ACK delay rule. If there is a dynamically switched UCI PUCCH scheduled by a DCI in slot m in the Scell, the UE multiplexes the SPS HARQ-ACK and the UCI if the UE has not determined the target slot before slot m in the time domain. The UE determines the PUCCH set from the Scell based on the sum of the size of the SPS HARQ-ACK and the size of the UCI. The UE determines the multiplexed PUCCH from the determined PUCCH set based on the PRI in the DCI. The DCI contains a PUCCH carrier indicator field which is used to indicate a carrier for PUCCH transmission.

If the multiplexed PUCCH is invalid, the SPS HARQ-ACK is continued to be delayed in the Pcell or the SPS HARQ-ACK is continued to be delayed in the Scell. The invalid PUCCH means that the PUCCH conflicts with DL symbols (also including SSB and downlink control channel corresponding symbols).

If the multiplexed PUCCH is valid, the multiplexed PUCCH is transmitted. The UE terminates the SPS HARQ-ACK delay feedback process.

Here, slot m is not earlier than slot n in the time domain.

The second case: the UE determines that the slot k of the Pcell is the target slot according to the SPS HARQ-ACK delay rule from the Pcell. If there is a dynamically switched UCI PUCCH scheduled by DCI in slot m in Scell, the UE multiplexes SPS HARQ-ACK and the UCI if slot m and slot k overlap in time domain. The UE determines the PUCCH set from the Scell based on the sum of the size of the SPS HARQ-ACK and the size of the UCI. The UE determines the multiplexed PUCCH from the determined PUCCH set based on the PRI in the DCI. The DCI contains a PUCCH carrier indicator field which is used to indicate a carrier for PUCCH transmission.

If the multiplexed PUCCH is invalid, the SPS HARQ-ACK is continued to be delayed in the Pcell or the SPS HARQ-ACK is continued to be delayed in the Scell. The invalid PUCCH means that the PUCCH conflicts with DL symbols (also including SSB and downlink control channel corresponding symbols).

If the multiplexed PUCCH is valid, the multiplexed PUCCH is transmitted. The UE terminates the SPS HARQ-ACK delay feedback process.

The third case: the UE determines that the slot k of the Pcell is the target slot according to the SPS HARQ-ACK delay rule from the Pcell. If there is a dynamically switched UCI PUCCH scheduled by DCI in slot m in Scell, the UE transmits SPS HARQ-ACK in slot k and transmits UCI PUCCH in slot m if slot k is earlier than slot m in time domain. The DCI contains a PUCCH carrier indicator field which is used to indicate a carrier for PUCCH transmission.

In the above cases, although the delayed SPS HARQ-ACK can be transmitted in the Scell, the counting unit corresponding to the maximum range k1+k1def of the SPS HARQ-ACK delay is the slot of the Pcell. k1+k1def is used to determine the latest slot that the delayed SPS HARQ-ACK can be used. k1 is the initial slot of SPS HARQ-ACK, the value of k1def is configured by RRC signaling and the unit is slot.

Embodiment 8

In some embodiments, a method of retransmitting a cancelled HARQ-ACK codebook is being studied. This method is to trigger an enhanced type3 codebook through DCI, and use the enhanced type3 codebook to retransmit the cancelled HARQ-ACKs. The enhanced type3 codebook is constructed based on an indicated HARQ process ID set from multiple HARQ process ID sets configured by RRC signaling. If the HARQ process ID corresponding to a HARQ-ACK is not included in the indicated HARQ process ID set, then the HARQ-ACK cannot be included in the enhanced type3 codebook.

At the same time, the specification of SPS HARQ-ACK delayed feedback is being formulated. Its main function is to allow SPS HARQ-ACK to be delayed in subsequent slots for transmission only in Pcell.

Currently, interactive operations are being considered in SPS HARQ-ACK delay and HARQ-ACK codebook retransmission. The following provides a way to support this interactive operation.

The UE is configured with SPS HARQ-ACK delayed feedback, and is configured with HARQ-ACKs to retransmit based on the enhanced type3 codebook. If the UE is indicated by a DCI to transmit an enhanced type3 codebook in a PUCCH slot (denoted as slot k).

If the UE determines that slot m is the target slot to transmit delayed SPS HARQ-ACKs, the UE shall process according to one of the following rules:

Rule 1:

If the HARQ process ID corresponding to the delayed SPS HARQ-ACK is included in the HARQ process ID set corresponding to the enhanced type 3 codebook, the UE stops the SPS HARQ-ACK delay process and transmits the enhanced type 3 codebook in slot k; otherwise, the UE multiplexes the delayed SPS HARQ-ACK and the enhanced type3 codebook. For example, the delayed SPS HARQ-ACK is concatenated after the enhanced type3 codebook. The UE determines the PUCCH set based on the sum of the size of the delayed SPS HARQ-ACK and the size of the enhanced type3 codebook. The UE determines the multiplexed PUCCH based on the PRI in the DCI from the determined PUCCH set.

In rule 1, there is no need to consider the positional relationship between slot k and slot m in the time domain.

Rule 2:

If slot m is earlier than slot k in the time domain, the UE transmits the delayed SPS HARQ-ACK in slot m, and transmits the enhanced type3 codebook in slot k. The two mechanisms do not need to interoperate.

If slot m and slot k overlap in the time domain, the UE multiplexes the delayed SPS HARQ-ACK and the enhanced type 3 codebook, for example, the delayed SPS HARQ-ACK is concatenated after the enhanced type 3 codebook. The UE determines the PUCCH set based on the sum of the size of the delayed SPS HARQ-ACK and the size of the enhanced type3 codebook. The UE determines the multiplexed PUCCH based on the PRI in the DCI from the determined PUCCH set.

In rule 2, there is no need to consider whether the HARQ process ID corresponding to the SPS HARQ-ACK is included in the HARQ process ID set corresponding to the enhanced type3 codebook.

Rule 3:

If slot m is earlier than slot k in the time domain, and if the HARQ process ID corresponding to the delayed SPS HARQ-ACK is included in the HARQ process ID set corresponding to the enhanced type 3 codebook, the UE transmits the delayed SPS HARQ-ACK in slot m and transmits the enhanced type3 codebook in slot k, or the UE stops performing SPS HARQ-ACK delay feedback and the UE transmits the enhanced type3 codebook in slot k.

If slot m is earlier than slot k in the time domain, and if the HARQ process ID corresponding to the delayed SPS HARQ-ACK is not included in the HARQ process ID set corresponding to the enhanced type3 codebook, the UE transmits the delayed SPS HARQ-ACK is in slot m and transmits the enhanced type3 codebook in slot k, or the UE multiplexes the delayed SPS HARQ-ACK and the enhanced type 3 codebook, for example, the delayed SPS HARQ-ACK is concatenated after the enhanced type 3 codebook. The UE determines the PUCCH set based on the sum of the size of the delayed SPS HARQ-ACKs and the size of the enhanced type3 codebook. The UE determines the multiplexed PUCCH based on the PRI in the DCI from the determined PUCCH set.

If slot m and slot k overlap in the time domain, and if the HARQ process ID corresponding to the delayed SPS HARQ-ACK is included in the HARQ process ID set corresponding to the enhanced type3 codebook, the UE stops SPS HARQ-ACK delayed feedback, and UE transmits enhanced type3 codebook in slot k.

If slot m and slot k overlap in the time domain, and if the HARQ process ID corresponding to the delayed SPS HARQ-ACK is not included in the HARQ process ID set corresponding to the enhanced type 3 codebook, the UE multiplexes the delayed SPS HARQ-ACK and enhanced type3 codebook, for example, the delayed SPS HARQ-ACK is concatenated after the enhanced type 3 codebook. The UE determines the PUCCH set based on the sum of the size of the delayed SPS HARQ-ACK and the size of the enhanced type3 codebook. The UE determines the multiplexed PUCCH based on the PRI in the DCI from the determined PUCCH set.

Figure 9:
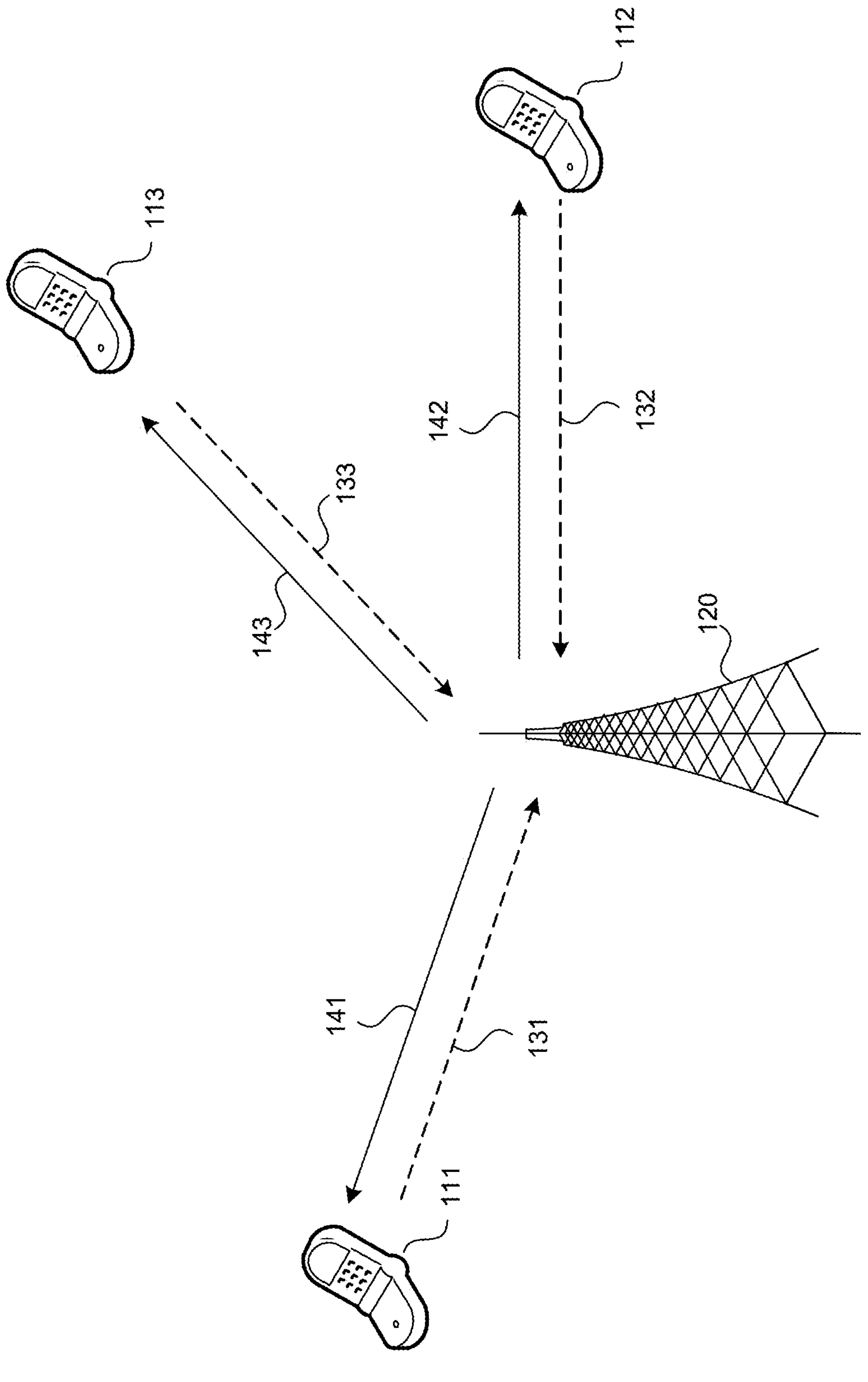
FIG. 9 shows an example wireless network in which various embodiments described in the present document may be implemented.

FIG. 9 shows an example of a wireless communication system (e.g., a long term evolution (LTE), 5G or NR cellular network) that includes a network device, e.g., a base station BS 120 and one or more user equipment (UE) 111, 112 and 113. In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. The UE may be, for example, a smartphone, a tablet, a mobile computer, a machine to machine (M2M) device, a terminal, a mobile device, an Internet of Things (IoT) device, and so on.

Figure 10:
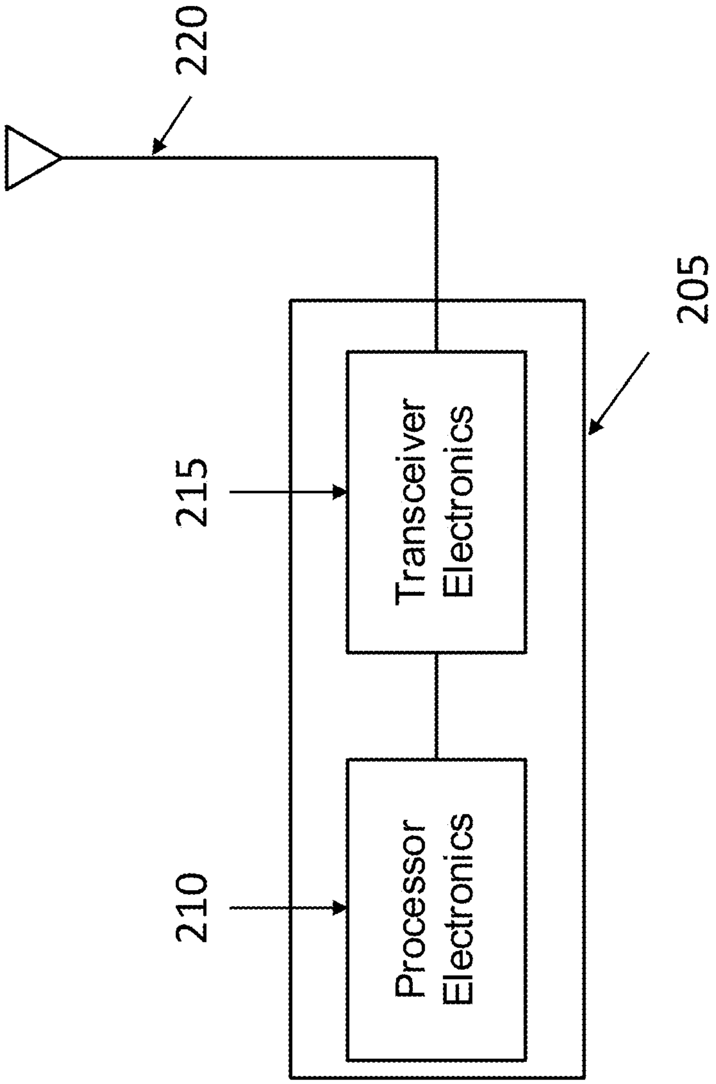
FIG. 10 shows an example hardware platform used for implementing various embodiments described in the present document.

FIG. 10 is a block diagram representation of a portion of an apparatus based on some embodiments of the disclosed technology. An apparatus 205 such as a network device or a base station or a wireless device (or UE), can include processor electronics 210 such as a microprocessor that implements one or more of the techniques presented in this document. The apparatus 205 can include transceiver electronics 215 to send and/or receive wireless signals over one or more communication interfaces such as antenna(s) 220. The apparatus 205 can include other communication interfaces for transmitting and receiving data. Apparatus 205 can include one or more memories (not explicitly shown) configured to store information such as data and/or instructions. In some implementations, the processor electronics 210 can include at least a portion of the transceiver electronics 215. In some embodiments, at least some of the disclosed techniques, modules or functions are implemented using the apparatus 205.

Various embodiments may preferably implement the following technical solutions.

Figure 11:
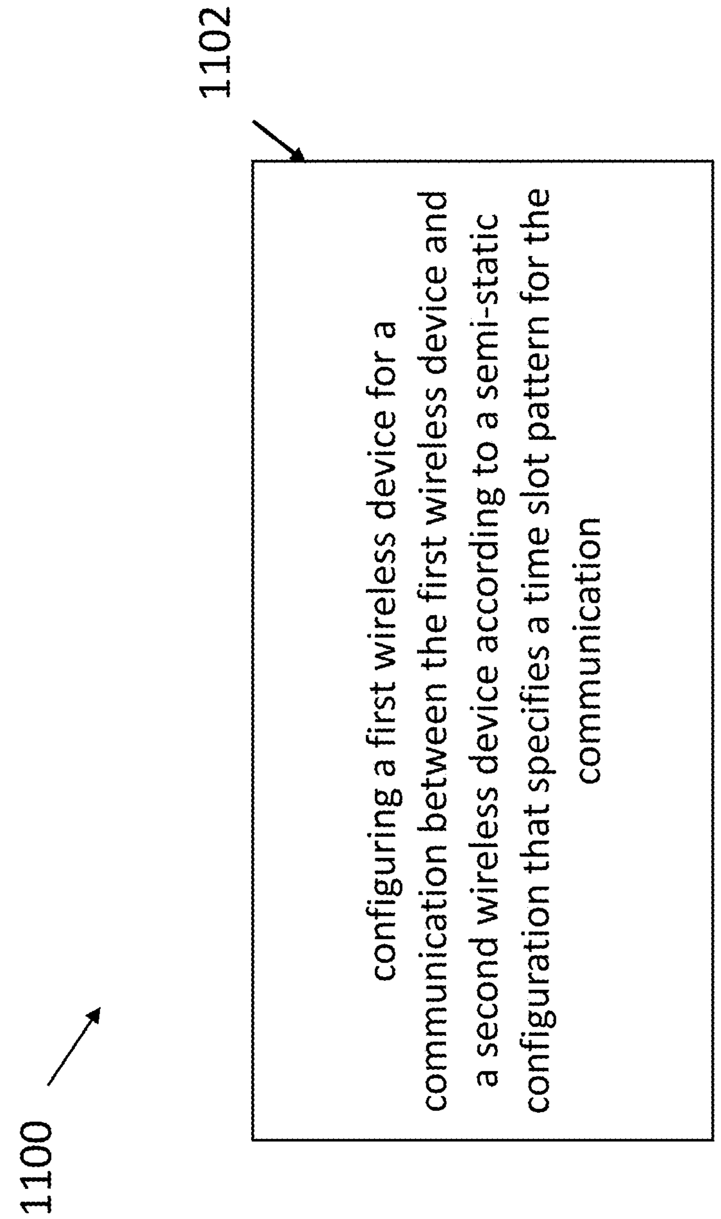
FIG. 11 is a flowchart of an example wireless communication method.

1. A method of wireless communication (e.g., method 1100 depicted in FIG. 11), comprising: configuring (1102) a first wireless device for a communication between the first wireless device and a second wireless device according to a semi-static configuration that specifies a time slot pattern for the communication, wherein M carriers are configured for the communication, M being an integer greater than 1; wherein the M carriers include a reference carrier; wherein the time slot pattern is configured across the M carriers based on the units of time slots of the reference carrier of the M carriers; wherein, for each time slot in the time slot pattern, a corresponding carrier from the M carriers and/or a slot in the corresponding carrier on which the communication occurs is specified by a rule. For example, various configuration embodiments are described with reference to FIGS. 1-8. The communication between the first wireless device and the second wireless device may include transmitting from the first wireless device to the second wireless device according to the semi-static configuration and/or receiving by the first wireless device a transmission from the second wireless device according to the semi-static configuration.

2. The method of solution 1, wherein the M carriers have a same time slot duration, and wherein the rule specifies that a parameter is associated with each time slot in the time slot pattern, wherein the parameter identifies a corresponding carrier from the M carriers that is used by a transmission in the corresponding time slot. For example, some example embodiments of using multi-carrier communication with uniform TDD slots are described with reference to FIGS. 1 to 4 and 8.

3. The method of solution 1, wherein the rule specifies that a first parameter and a second parameter are associated with each time slot in the time slot pattern, wherein the first parameter identifies a corresponding carrier from the M carriers and the second parameter identifies a time slot of the corresponding carrier that is used by a transmission. For example, some example embodiments in which multiple parameters may be used are described with reference to FIGS. 5 to 7.

4. The method of any one of solutions 1-3, wherein the time slot pattern is repetitive with a pattern configuration period, wherein the pattern configuration period corresponds to a frame period of the main carrier, a common frame period between the main carrier and other carriers, or a period configured by a radio resource control, RRC, signaling.

5. The method of solution 1, when the M carriers have different time slot durations, and wherein the rule specifies that a parameter is associated with each time slot in the time slot pattern according to the reference carrier indicative of a time slot of a carrier from the M carrier that overlaps with the time slot in the time slot pattern according to reference carrier. For example, some example embodiments in which different carriers have different time-slot periods are described with reference to FIGS. 5 to 7.

6. The method of any of solutions 1-5, further including: determining, by the first wireless device, a hybrid automatic repeat request (HARQ) process identifier (ID) for a transmission in a time slot in the time slot pattern in a carrier according to a period P, wherein the period P is determined based on the period of the time slots in the time slot pattern in the carrier. Some example embodiments are described with reference to the section heading Embodiment 4.

7. The method of any of solutions 1-6, wherein the first wireless device is a user equipment and the second wireless device is a network device. According to these solutions, the UE may be configured based on a message received from the network device, or the UE may be configured according to a pre-determined rule.

8. The method of any one of solutions 1-6, wherein the first wireless device is a network device and the second wireless device is a user equipment. According to these solutions, the base station may configure itself, or may configure according to a pre-determined rule which may be known a priori to UEs and the base station.

9. The method of any of solutions 1-8, wherein the reference carrier corresponds to a PCell or a carrier with a minimum index or a carrier with a maximum index or a carrier with a minimum subcarrier spacing, or a carrier with a maximum subcarrier spacing or a carrier configured by a signaling. With respect to the identity of the reference carrier, BS and UE may know this information either through a priori rule known to both BS and UE or according to signaling communicated between BS and UE.

10. An apparatus for wireless communication comprising a processor, configured to implement a method recited in any of solutions 1-9. Example embodiments are described with reference to FIG. 10.

11. A non-transitory computer readable program storage medium having code stored thereon, the code, when executed by a processor, causing the processor to implement a method recited in any of solutions 1-9.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

The invention claimed is:

1. A method of wireless communication, comprising:

configuring a first wireless device, by a second wireless device, for a communication between the first wireless device and the second wireless device according to a semi-static configuration, wherein the semi-static configuration specifies a time slot pattern for the communication, wherein M carriers are configured, by the second wireless device, for the communication, wherein M is an integer greater than 1, wherein the communication comprises a cross carrier downlink semi-static transmission on a physical downlink shared channel (PDSCH) or a cross-carrier uplink semi-static transmission on a physical uplink shared channel (PUSCH);

wherein the M carriers include a reference carrier, wherein the reference carrier is used to configure the cross-carrier downlink semi-static transmission or the cross-carrier uplink semi-static transmission;

wherein the time slot pattern is configured across the M carriers using time slots of the reference carrier of the M carriers;

wherein, for each time slot in the time slot pattern, a rule specifies a carrier of the M carriers on which the communication occurs or a time slot in the carrier of the M carriers on which the communication occurs; and wherein the rule specifies that a bit is set for each period of the cross-carrier uplink semi-static transmission or for each period of the cross-carrier downlink semi-static transmission, and wherein the carrier and the time slot are determined for the each period of the cross-carrier uplink semi-static transmission or for the each period of the cross-carrier downlink semi-static transmission according to a value of the bit.

2. The method of claim 1, wherein each carrier of the M carriers has a same time slot duration; and wherein the rule further specifies that a parameter is associated with each time slot in the time slot pattern, wherein the parameter identifies a carrier of the M carriers, and wherein the carrier from the M carriers is used by a transmission in the each time slot.

3. The method of claim 1, wherein the rule further specifies that a first parameter and a second parameter are associated with each time slot in the time slot pattern, wherein the first parameter identifies a carrier of the M carriers and the second parameter identifies a time slot of the carrier that is used by a transmission.

4. The method of claim 1, wherein the time slot pattern is repetitive with a pattern configuration period, wherein the pattern configuration period corresponds to a frame period of the reference carrier, a common frame period between the reference carrier and other carriers, or a period configured by a radio resource control (RRC) signaling.

5. The method of claim 1, wherein the M carriers have different time slot durations, and wherein the rule further specifies that a parameter is associated with each time slot in the time slot pattern according to the reference carrier, wherein the parameter identifies a time slot of a carrier of the M carriers, and wherein the time slot of the carrier of the M carriers overlaps with the time slot in the time slot pattern according to the reference carrier.

6. The method of claim 1, further comprising:

determining, by the first wireless device, a hybrid automatic repeat request (HARQ) process identifier (ID) for a transmission in a time slot in the time slot pattern in a carrier according to a period P, wherein the period P is determined based on the period of the time slots in the time slot pattern in the carrier.

7. The method of claim 1, wherein the first wireless device is a user equipment (UE) and the second wireless device is a network device.

8. The method of claim 1, wherein the first wireless device is a network device and the second wireless device is a user equipment (UE).

9. The method of claim 1, wherein the reference carrier corresponds to a PCell, a carrier with a minimum index, a carrier with a maximum index, or a carrier with a minimum subcarrier spacing; or wherein the reference carrier corresponds to a carrier with a maximum subcarrier spacing or a carrier configured by a signaling.

10. A wireless device comprising processor electronics and a memory storing instructions, execution of which by the processor electronics causes the wireless device to:

configure the wireless device for a communication between the wireless device and a second wireless device according to a semi-static configuration, wherein the semi-static configuration specifies a time slot pattern for the communication, wherein M carriers are configured for the communication, wherein M is an integer greater than 1, wherein the communication comprises a cross carrier downlink semi-static transmission on a physical downlink shared channel (PDSCH) or a cross-carrier uplink semi-static transmission on a physical uplink shared channel (PUSCH);

wherein the M carriers include a reference carrier;

wherein the time slot pattern is configured across the M carriers using time slots of the reference carrier of the M carriers;

wherein, for each time slot in the time slot pattern, a rule specifies a corresponding carrier of the M carriers on which the communication occurs or a time slot in the corresponding carrier of the M carriers on which the communication occurs; and wherein the rule specifies that a bit is set for each period of the cross-carrier uplink semi-static transmission or for each period of the cross-carrier downlink semi-static transmission, and wherein the carrier and the time slot are determined for the each period of the cross-carrier uplink semi-static transmission or for the each period of the cross-carrier downlink semi-static transmission according to a value of the bit.

11. The wireless device of claim 10, wherein each carrier of the M carriers has a same time slot duration; and wherein the rule further specifies that a parameter is associated with each time slot in the time slot pattern, wherein the parameter identifies a carrier of the M carriers, and wherein the carrier from the M carriers is used by a transmission in the each time slot.

12. The wireless device of claim 10, wherein the rule further specifies that a first parameter and a second parameter are associated with each time slot in the time slot pattern, wherein the first parameter identifies a carrier of the M carriers and the second parameter identifies a time slot of the carrier that is used by a transmission.

13. The wireless device of claim 10, wherein the time slot pattern is repetitive with a pattern configuration period, wherein the pattern configuration period corresponds to a frame period of the reference carrier, a common frame period between the reference carrier and other carriers, or a period configured by a radio resource control (RRC) signaling.

14. The wireless device of claim 10, wherein the M carriers have different time slot durations, and wherein the rule further specifies that a parameter is associated with each time slot in the time slot pattern according to the reference carrier, wherein the parameter identifies a time slot of a carrier of the M carriers, and wherein the time slot of the carrier of the M carriers overlaps with the time slot in the time slot pattern according to the reference carrier.

15. The wireless device of claim 10, further caused to:

determine a hybrid automatic repeat request (HARQ) process identifier (ID) for a transmission in a time slot in the time slot pattern in a carrier according to a period P, wherein the period P is determined based on the period of the time slots in the time slot pattern in the carrier.

16. The wireless device of claim 10, wherein the wireless device is a user equipment (UE) and the second wireless device is a network device.

17. The wireless device of claim 10, wherein the wireless device is a network device and the second wireless device is a user equipment (UE).

18. The wireless device of claim 10, wherein the reference carrier corresponds to a PCell, a carrier with a minimum index, a carrier with a maximum index, or a carrier with a minimum subcarrier spacing; or wherein the reference carrier corresponds to a carrier with a maximum subcarrier spacing or a carrier configured by a signaling.

19. A non-transitory computer-readable medium storing instructions, execution of which by a processor of a computing system causes the computing system to:

implement the method recited in claim 1.

20. A method of wireless communication, comprising:

receiving, by a first wireless device from a second wireless device, a configuration for a communication between the first wireless device and the second wireless device according to a semi-static configuration that specifies a time slot pattern for the communication, wherein the communication uses M carriers configured by the second wireless device, wherein M is an integer greater than 1, wherein the communication comprises a cross-carrier downlink semi-static transmission on a physical downlink shared channel (PDSCH) or a cross-carrier uplink semi-static transmission on a physical uplink shared channel (PUSCH);

wherein the M carriers include a reference carrier, wherein the reference carrier is used to configure the cross-carrier downlink semi-static transmission or the cross-carrier uplink semi-static transmission;

wherein the time slot pattern is configured across the M carriers using time slots of the reference carrier of the M carriers;

wherein, for each time slot in the time slot pattern, a rule specifies a carrier of the M carriers on which the communication occurs or a time slot in the carrier of the M carriers on which the communication occurs; and wherein the rule specifies that a bit is set for each period of the cross-carrier uplink semi-static transmission or for each period of the cross-carrier downlink semi-static transmission, and wherein the carrier and the time slot are determined for the each period of the cross-carrier uplink semi-static transmission or for the each period of the cross-carrier downlink semi-static transmission according to a value of the bit.

21. The method of claim 20, wherein each carrier of the M carriers has a same time slot duration; and wherein the rule further specifies that a parameter is associated with each time slot in the time slot pattern, wherein the parameter identifies a carrier of the M carriers, and wherein the carrier from the M carriers is used by a transmission in the each time slot.

22. The method of claim 1, wherein the rule further specifies that a first parameter and a second parameter are associated with each time slot in the time slot pattern, wherein the first parameter identifies a carrier of the M carriers and the second parameter identifies a time slot of the carrier that is used by a transmission.

23. The method of claim 1, wherein the time slot pattern is repetitive with a pattern configuration period, wherein the pattern configuration period corresponds to a frame period of the reference carrier, a common frame period between the reference carrier and other carriers, or a period configured by a radio resource control (RRC) signaling.

24. The method of claim 1, wherein the M carriers have different time slot durations, and wherein the rule further specifies that a parameter is associated with each time slot in the time slot pattern according to the reference carrier, wherein the parameter identifies a time slot of a carrier of the M carriers, and wherein the time slot of the carrier of the M carriers overlaps with the time slot in the time slot pattern according to the reference carrier.

25. The method of claim 1, further comprising:

determining, by the first wireless device, a hybrid automatic repeat request (HARQ) process identifier (ID) for a transmission in a time slot in the time slot pattern in a carrier according to a period P, wherein the period P is determined based on the period of the time slots in the time slot pattern in the carrier.

26. The method of claim 1, wherein the first wireless device is a user equipment (UE) and the second wireless device is a network device.

27. The method of claim 1, wherein the first wireless device is a network device and the second wireless device is a user equipment (UE).

28. The method of claim 1, wherein the reference carrier corresponds to a PCell, a carrier with a minimum index, a carrier with a maximum index, or a carrier with a minimum subcarrier spacing; or wherein the reference carrier corresponds to a carrier with a maximum subcarrier spacing or a carrier configured by a signaling.

* * * * *